United States Patent Office 2,933,507

Patented Apr. 19, 1960

2,933,507

3,3-BIS (p-HYDROXYPHENYL)-6-CARBOXYPHTHALIDE

William Hodes, Stamford, Conn., assignor to Standard Oil Company, Chicago, Ill., a corporation of Indiana Application January 22, 1959, Serial No. 788,273

1 Claim. (Cl. 260—343.4)

This is a continuation-in-part of my copending application Serial No. 658,943, filed May 14, 1957, now abandoned.

This invention relates to a condensation product of phenol and trimellitic anhydride, which product is a titration indicator dye.

Phenolphthalein is the commonly used indicator dye for acid-base titrations. Phenolphthalein has a disadvantage for this use in that the color change takes place in aqueous solution at a pH of about 8.5.

An object of the invention is an indicator dye suitable for use in titration which has a color change closer to the neutral point than phenolphthalein. This object is obtained by a condensation product of phenol and trimellitic anhydride which product is a solid having about two hydroxyphenyl groups per trimellitide group.

The composition of matter which is the subject of this invention is formed by the condensation of about 2 moles of phenol (monohydroxy benzene) and 1 mole of trimellitic anhydride. The condensation reaction is carried out in the presence of an acidic catalyst. Suitable catalysts for the condensation reaction are the various Friedel-Crafts catalysts such as aluminum chloride, zinc chloride, ferric chloride, etc. and acids such as sulfuric acid, aromatic sulfonic acids, and alkane sulfonic acids. The condensation reaction may be carried out at a temperature between about 100° C. and about 150° C. It is preferred to agitate the mixture of phenol, trimellitic anhydride and catalyst rapidly in an inert atmosphere while maintaining the condensation reaction mixture at a temperature between about 120° and 140° C.

An excess of phenol is used in the reaction zone in order to improve the yield of desired product which excess phenol may be removed by steam distillation from the reaction product. The reaction product is extracted from the materials present at the end of the condensation reaction with a dilute aqueous alkaline solution; the product is purified from solution by acidifying the alkaline solution. High purity material is obtained by crystallization from a solvent such as methanol and water. The product may be first purified by passing a solution through activated charcoal or fuller's earth.

EXAMPLE

In a typical condensation reaction 3.8 grams (0.02 mole) of trimellitic anhydride, technical grade, were intimately mixed with 5.16 grams (0.044 mole) of phenol and 0.7 gram (0.02 mole) of zinc chloride catalyst. These materials were intimately mixed and stirred at a temperature of 135°–140° C. under a nitrogen atmosphere and phenol reflux for a time of 4 hours. At this time, the unreacted phenol was removed by steam distillation. The materials present in the reactor were washed therefrom and extracted with 5% aqueous sodium carbonate solution. A solid material was precipitated from the extract solution by acidifying with sulfuric acid. This solid material was dissolved in a solution of 65 parts of methanol and 35 parts of water and was passed through activated charcoal to remove color. The temperature of the alcohol solution was lowered until a white crystalline solid precipitated therefrom. Upon analysis for acid content, the crystallized solid had an acid number of 401, the theoretical for a material containing two hydroxyphenyl groups and one trimellitide group is 462.

The white solid was slowly heated to determine its melting point. At about 85° C. the white color changed to pink; as the heating continued, the pink color faded and the material returned to white color at about 100° C. The solid material melted in the region of 145°–150° C. As the material cooled, it passed through the same color change in the same temperature range as occurred on the set up in temperature.

An aqueous solution of the white material was prepared by dissolving 0.1 gram in 100 ml. of distilled water. This solution was titrated with 0.1 normal potassium hydroxide solution. As the titration proceeded, the colorless solution changed to an intense pink color at a pH of 7.88; the pink color disappeared at a pH of about 13. The pink solution was reverse titrated with aqueous hydrochloric acid; the pink color changed to a colorless solution at a pH of 7.92, thereby showing the color change to be completely reversible.

Ultra-violet spectra of phenolphthalein and of the condensation product of this invention were obtained for purposes of comparison. The maxima of the wave lengths were obtained in both the acid formed and the base formed (pH 11). The results of this comparison are set out in the table below.

*Table*

| | Phenolphthalein Wave Length (A.) | Condensation Product Wave Length (A.) |
|---|---|---|
| Acid | 2,300 | 2,320 |
| | 2,755 | 2,824 |
| Base | 2,510 | 2,440 |
| | 5,545 | 5,560 |

The ultra-violet spectra of the two compounds indicate that the structural configuration of the condensation product of this invention is closely similar to phenolphthalein. For this reason, the condensation product of the invention has been given the trivial name phenoltrimellitein. From the ultra-violet, phenoltrimellitein is 3,3-bis(p-hydroxyphenyl)-6-carboxyphthalide, i.e., phenolphthalein containing a carboxy group at the "6" position on the phthalide portion of the molecule. A structural representation of the new composition of this invention, with the numbering used set out in parentheses, is as follows:

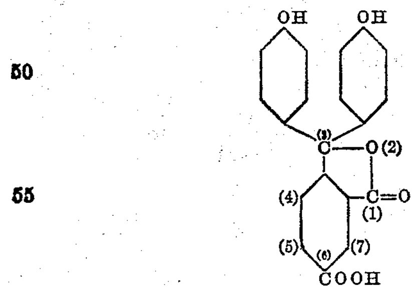

The composition of the invention by virtue of its about one-half pH unit closer approached to the neutral point and its much sharper color change is a much more satisfactory and desirable indicator dye than phenolphthalein.

It is to be understood that the composition of the instant invention, like phenolphthalein, has other uses than as an indicator dye and the scope of the claim is not to be limited to such use.

Thus having described the invention, what is claimed is:

3,3-bis(p-hydroxyphenyl)-6-carboxyphthalide.

No references cited.